United States Patent
Chandrashekarappa et al.

(10) Patent No.: US 10,234,303 B1
(45) Date of Patent: Mar. 19, 2019

(54) METHODS AND SYSTEMS FOR PROVIDING VISUALLY AUTOMATED IN-COCKPIT AIRCRAFT DOCKING GUIDANCE WITH USE OF AIRPORT MOVING MAP APPLICATIONS

(71) Applicant: HONEYWELL INTERNATIONAL INC., Morris Plains, NJ (US)

(72) Inventors: Mohan Gowda Chandrashekarappa, Karnataka (IN); Vijayakumar Gouda, Hyderabad (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/907,528

(22) Filed: Feb. 28, 2018

(51) Int. Cl.
*G01C 21/00* (2006.01)
*G01C 21/36* (2006.01)

(52) U.S. Cl.
CPC ....... *G01C 21/367* (2013.01); *G01C 21/3602* (2013.01); *G01C 21/3635* (2013.01)

(58) Field of Classification Search
CPC ........ G01C 21/367; G01C 21/32; G08G 5/06; G08G 5/0021; G08G 5/0047; G08G 5/04; G08G 5/065
See application file for complete search history.

(56) References Cited

U.S. PATENT DOCUMENTS

| | | |
|---|---|---|
| 5,675,661 A | 10/1997 | Richman et al. |
| 5,889,479 A | 3/1999 | Tabel |
| 6,100,964 A | 8/2000 | De Cremiers |
| 8,024,078 B2 * | 9/2011 | Coulmeau ............ G08G 5/0013 244/75.1 |
| 8,072,382 B2 | 12/2011 | Smith et al. |

(Continued)

FOREIGN PATENT DOCUMENTS

| | | |
|---|---|---|
| CN | 101833104 B | 9/2012 |
| CN | 106814370 A | 6/2017 |

(Continued)

OTHER PUBLICATIONS

Pellegrini, P.F., et al.; Moving Object Detection and Tracking in Airport Surface Radar Images; 1994 Elsevier Science B.V.

(Continued)

*Primary Examiner* — Toan N Pham
(74) *Attorney, Agent, or Firm* — Lorenz & Kopf, LLP

(57) ABSTRACT

Methods provide for guidance without sensing data about an ownship, the method includes: pre-loading, from an airport mapping database to an lateral guidance computer within a cockpit, airport mapping data for use in guidance of the ownship from a lateral guidance computer; executing airport moving map applications to process the airport mapping data to form a synthesized view for displaying on a display within the cockpit; receiving by the electronic information device within the cockpit at least one of a 3D spatial representation of the ownship; overlaying the 3D spatial representation of the ownship onto the synthesized view for providing a visual 3D representation of the ownship; and providing, without using the sensing data about the ownship, one or more cues, by a digital taxi application based on only airport mapping data and dimensions associated with the 3D spatial representation of the ownship, on the display within the cockpit.

20 Claims, 10 Drawing Sheets

(56) References Cited

U.S. PATENT DOCUMENTS

| 9,384,586 | B1 | 7/2016 | McCusker et al. |
| 9,656,607 | B2 | 5/2017 | Stein et al. |
| 9,783,320 | B2 | 10/2017 | Barnes et al. |
| 2014/0085124 | A1 | 3/2014 | Dusik et al. |
| 2014/0303815 | A1* | 10/2014 | Lafon ................ G01C 21/3446 701/3 |
| 2016/0171899 | A1* | 6/2016 | Depare ................ G08G 5/065 701/120 |
| 2016/0247406 | A1 | 8/2016 | Khatwa et al. |

FOREIGN PATENT DOCUMENTS

| WO | 2009075648 A1 | 6/2009 |
| WO | 2016162500 A1 | 10/2016 |

OTHER PUBLICATIONS

Kumar, N.S., et al.; Integrated Enhanced and Synthetic Vision System for Transport Aircraft; Defence Science Journal, vol. 63, No. 2, Mar. 2013, pp. 157-163, DOI: 10.14429/dsj.63.4258 © 2013.

* cited by examiner

US 10,234,303 B1

METHODS AND SYSTEMS FOR PROVIDING VISUALLY AUTOMATED IN-COCKPIT AIRCRAFT DOCKING GUIDANCE WITH USE OF AIRPORT MOVING MAP APPLICATIONS

TECHNICAL FIELD

Embodiments of the subject matter described herein relate generally to avionics systems such as flight display systems and more particularly to methods and systems for providing visually automated aircraft docking guidance using airport moving map (AMM) applications in cockpit displays for an aircraft to dock without external guidance to gates in the terminal area.

BACKGROUND

Traffic levels rise, airports expand, and surface routes change, requiring pilots to understand how to maneuver about the airport, and potentially increasing their workload. Besides learning about the different movement areas on the airport, the added combination of changes in weather, time of day and amount of aircraft traffic can increase the risk of error. Several surveillance solutions and onboard pilot aids, like the Airport Moving Maps have greatly enhanced the safety and efficiency of terminal area operations by intuitively presenting to the pilot a synthesized view of the aerodrome surface, visual aids and markings and airport structures.

Accordingly, it would be desirable to increase a pilot's situational awareness by providing an onboard avionics system and method that provides a flight crew with an improved graphical representation of the various features of an airport environment for enabling automated assists for docking of an aircraft without external assistance.

It would further be desirable to provide an aircraft docking guidance system using Digital Taxi Applications (e.g., cues, guidance, imagery, 3D modeling of aircraft types, deviations in path to the gate etc.) while rendering on synthesized views 3D aircraft models of the ownship on Airport Moving Map (AMM) applications. Such information will help bring visual deviations in alignment of the ownship during docking operations to a pilot's attention and enable the pilot to determine corrective and/or preventative actions. It is still further desirable to provide an intuitive representation of distance between references of a synthesized 3D model of an ownship with reference gate or stand points to accomplish a parking operation of an ownship without external manual guide assistance. The present disclosure addresses at least this need.

BRIEF SUMMARY

Methods for enhancing situational awareness and automation of ground docking guidance onboard an ownship during a ground maneuver are provided.

In an exemplary embodiment, a method for providing guidance without sensing data about an ownship is provided. The method includes: pre-loading, from an airport mapping database to an electronic information device within a cockpit, airport mapping data for use in guidance of the ownship wherein the electronic information device includes: a lateral guidance computer; executing airport moving map applications by the electronic information device to process the airport mapping data to form a synthesized view for displaying on a display within the cockpit, wherein the airport mapping data includes: an aerodrome surface, visual aids and markings, and airport structures; receiving by the electronic information device within the cockpit at least one of a 3D spatial representation of the ownship; overlaying the 3D spatial representation of the ownship onto the synthesized view for providing a visual 3D representation of the ownship; and providing, without the sensing data about the ownship, one or more cues, by a digital taxi application of the lateral guidance computer based on only airport mapping data and dimensions associated with the 3D spatial representation of the ownship, on the display of the synthesized view within the cockpit, wherein the cues are associated with information to guide the ownship to docking to a gate or stand location.

The receiving by the electronic information device further includes: alternately preloading the 3D spatial representation of an aircraft from a 3D database. The method further includes: updating the 3D spatial representation of the ownship from a remote 3D database at a connected server to the lateral guidance computer within a cockpit. The method further includes: providing one or more cues from a set of visual, aural, and message cues by the digital taxi application in the display within the cockpit associated with the information to guide the ownship to the docking to the gate or stand location.

The method, the information further includes: depicting parts in the visual 3D spatial representation of an airframe of the ownship for aligning the ownship based on data associated with the visual 3D spatial representation and the synthesized view; and generating aircraft surface guidance commands by computing relative deviations of alignments based on dimensions of the ownship to the docking at the gate or the stand location within the synthesized view using the data and the airport mapping information. The method further includes: aligning the ownship in the docking by processing, by the electronic information device using software solutions of the digital taxi application, one or more reference points based on dimensions of the ownship in the depicted parts which correspond with one or more location points to the gate or the stand location. The method further includes: enhancing aids to guide the ownship to the docking to the gate or the stand wherein the enhanced aids include: camera images from external sources.

In another embodiment, a computer program product for providing guidance to an ownship without a need for sensor data about the ownship, the product includes: a computer-readable storage medium in which program instructions are stored, the program instructions are configured to cause a lateral guidance computer to perform the operations of: pre-loading from an airport mapping database to the lateral guidance computer within a cockpit, airport mapping data for use in guidance of the ownship wherein the lateral guidance computer does not require any sensor data about the ownship from sensing devices of the ownship to provide the guidance; executing airport moving map applications by the lateral guidance computer to process the airport mapping data to form a synthesized view for displaying on a display within the cockpit, wherein the airport mapping data includes: an aerodrome surface, visual aids and markings, and airport structures; receiving by the lateral guidance computer within the cockpit a 3D spatial representation of the ownship; overlaying the 3D spatial representation of the ownship onto the synthesized view for providing a visual 3D representations of the ownship; and providing, without using sensor data from sensing devices about the ownship, one or more cues, by a digital taxi application of the lateral guidance computer based on airport mapping data and derived dimensions associated with the 3D spatial representation of the ownship, on the display of the synthesized view within the cockpit, wherein the cues are associated with information to guide the ownship in a docking action to a gate or stand location.

The method, the generating by the electronic information device further includes: alternately preloading the 3D spatial representation of the ownship from a 3D database. The method, further includes: updating the 3D spatial representation of the ownship from a remote 3D database at a connected server to the lateral guidance computer within a cockpit. The method further includes: providing one or more cues from a set of visual, aural, and message cues by the digital taxi application in the display within the cockpit associated with the information to guide the ownship in a docking action to the gate or stand location.

The method, the information further includes: depicting parts in the visual 3D representation of an airframe of the ownship for aligning the ownship based on data associated with the visual 3D representation and the synthesized view; and generating aircraft surface guidance commands by computing relative deviations of alignments based on dimensions of the ownship for docking at the gate or the stand location within the synthesized view using the data and the airport mapping information.

The method, further includes: aligning the ownship in the docking by processing, by the lateral guidance computer using software solutions, one or more reference points based on dimensions of the ownship in the depicted parts which correspond with one or more location points to the gate or the stand location. The method, further includes: enhancing aids to guide the ownship to the docking to the gate or the stand wherein the enhanced aids include: camera images from external sources.

A non-transitory computer-readable medium storing a computer program product executable by a processor of a lateral guidance computer system for processing an object request, the non-transitory computer-readable medium is provided. The method includes: code for pre-loading from an airport mapping database to the lateral guidance computer within a cockpit, airport mapping data for use in guidance of the ownship wherein the lateral guidance computer does not require any sensor data about the ownship from sensing devices of the ownship to provide the guidance; code for executing airport moving map applications by the electronic information device to process the airport mapping data to form a synthesized view for displaying on a display within the cockpit, wherein the airport mapping data includes: an aerodrome surface, visual aids and markings, and airport structures; code for receiving by the lateral computer within the cockpit a volumetric representation of the ownship; code for overlaying the volumetric representation of the ownship onto the synthesized view for providing a visual 3D representation of the ownship; and code for providing, without requiring sensor data from sensing devices about the ownship, one or more cues, by a digital taxi application of the lateral guidance computer based on airport mapping data and derived dimensions associated with the volumetric representation of the ownship, on the display of the synthesized view within the cockpit, wherein the cues are associated with information to guide the ownship to docking to a gate or stand location.

The non-transitory computer-readable medium further includes: code for alternately preloading the volumetric representation of the ownship from a 3D database. The non-transitory computer-readable medium, further includes: code for providing one or more cues from a set of visual, aural, and message cues by the taxi application in the display within the cockpit associated with the information to guide the ownship to the docking to the gate or stand location wherein all the provided cues are not based on sensor data. The non-transitory computer-readable medium, further includes: code for aligning the ownship in the docking by processing, by the lateral guidance computer using software solutions, one or more reference points in the depicted parts of the ownship to correspond with one or more location points to the gate or the stand location. The non-transitory computer-readable medium further includes: code for enhancing cues to guide the ownship to the docking to the gate or the stand wherein the enhanced cues include: images captured by mobile devices.

The non-transitory computer-readable medium of claim further includes: code for depicting parts in the visual 3D representation of an airframe of the ownship for aligning the ownship based on derived data associated with the visual 3D representation and the synthesized view; and code for generating aircraft surface guidance commands by computing relative deviations of alignments based on dimensions of the ownship to the docking at the gate or the stand location within the synthesized view using the data and the airport mapping information.

This summary is provided to describe select concepts in a simplified form that are further described in the Detailed Description.

This summary is not intended to identify key or essential features of the claimed subject matter, nor is it intended to be used as an aid in determining the scope of the claimed subject matter.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

A more complete understanding of the subject matter may be derived by referring to the following detailed description and claims when considered in conjunction with the following figures, wherein like reference numbers refer to similar elements throughout the figures: and wherein:

DETAILED DESCRIPTION

Figure 1:
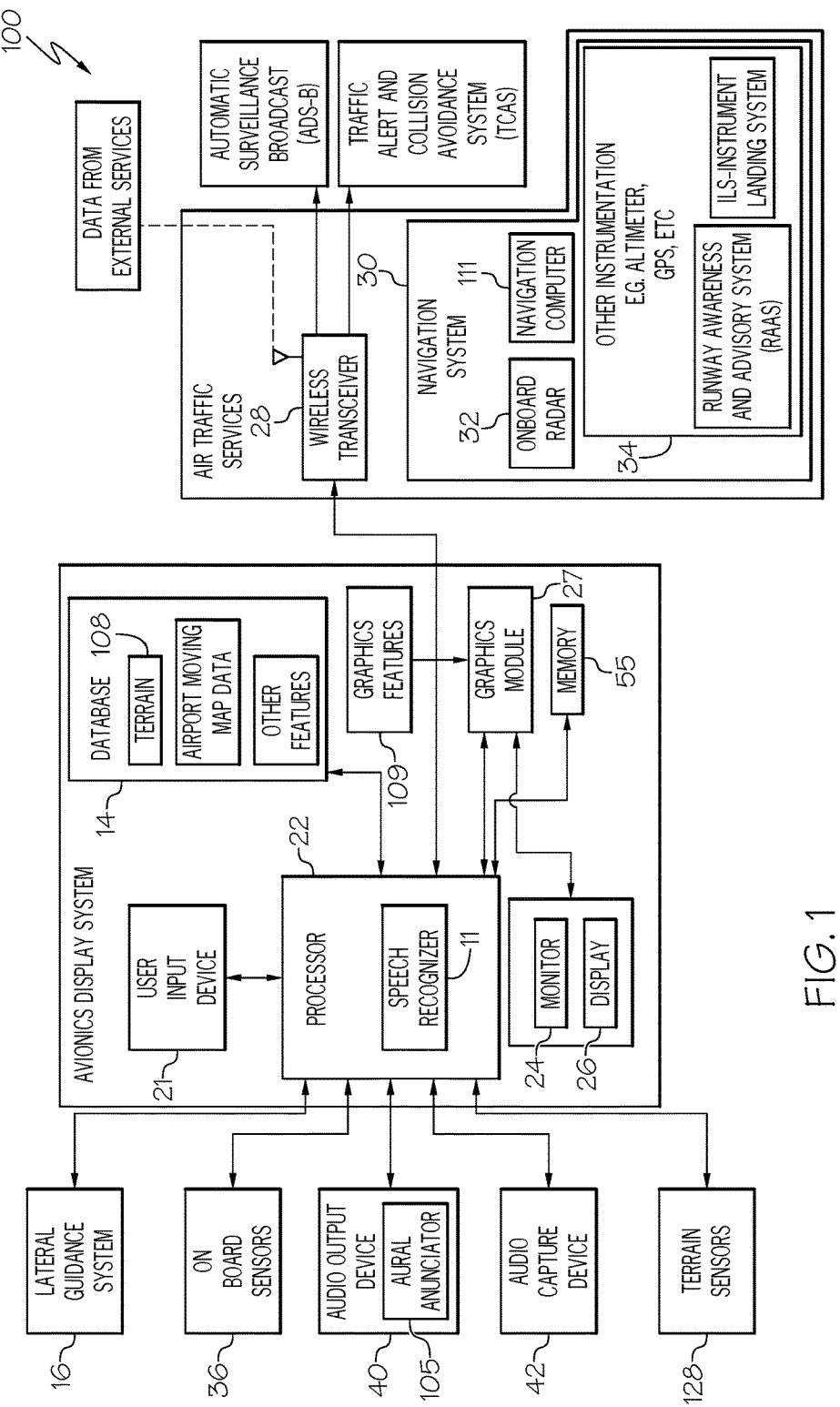
FIG. 1 is a block diagram of a system suitable for use in an aircraft in accordance with the exemplary embodiments described herein.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All the embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, brief summary, or the following detailed description.

The system and methods described herein can be deployed with any vehicle, including aircraft, automobiles, spacecraft, watercraft, and the like. The preferred embodiments of the system and methods described herein represent an intelligent way to present visual airport information to a pilot or flight crew during operation of the aircraft and, in particular, during taxi operations and final approach.

It is contemplated, though not limited, that the Digital Taxi will provide aids to the flight crew for ownship guidance based not on sensing data by sensors equipped in the ownship to sense surrounding of the ownship when providing the aids in a docking at a location or gate. Rather, the Digital Taxi will use mapping information as well modeling data of the ownship to provide guidance. That is, the Digital Taxi will not receive or process sensing data from the ownship sensors but will provide various guidance cues based on modeling and mapping data only. Additional sensing data may in particular instances be used to enhance the Digital Taxi applications but is not required.

Modern flight deck displays for vehicles (such as aircraft or spacecraft) display a considerable amount of information, such as vehicle position, speed, altitude, navigation, target, and terrain information. Two-dimensional and three-dimensional AMM displays provide synthetic views of an airport environment that enhances flight crew position and situational awareness during both taxi operations and final approach.

Terminal Safety embodies a safe flight from both the start and the conclusion of aircraft passage. That is, terminal safety is considered from when the aircraft pushes back from a gate and ends when the aircraft docks into a gate or is guided to a stand. Terminal safety continues to be a high priority for governmental regulatory agencies, and encompasses actions of the pilots, air traffic controllers and airport vehicle drivers. This is because most surface incidents are reported at and near the gates when, among other things, clearance from other aircraft and building structures is not clearly or properly anticipated by the pilot during aircraft maneuvers. Significant costs as a result of such incidents are as follows: costs of apron damages; direct costs resulting from the material and repair related to the incident; and indirect costs resulting from aircraft downtime such as from incident investigations. In the U.S., the National Transportation Safety Board (NTSB) identifies failure to maintain adequate visual lookout, failure to perceive the clearance from wingtips and obstacles, and failure to maintain the suggested clearances as the primary causes for surface incidents.

The Next Generation (NextGen) overhaul of the United States airspace system and the companion Single European Sky ATM Research (SESAR) overhaul of the European airspace system creates various trajectory-based mechanisms to improve air traffic management on these continents. Electronic instrumentation displays continue to advance in sophistication, achieving increasingly higher levels of information density and, consequently, presenting a greater amount of visual information to be perceived and understood by the operator, e.g., the pilot, and adding to burdens incurred by the pilot.

In addition, Trajectory-Based Operations, part of the NextGen to add flexibility to the 4-D trajectories of flights as they traverse airspace and to minimize the airlines operating costs by reducing distance flown, may also be involved. This is because, the 4D Trajectory-Based Management not only defines 3-dimensional flight paths based on points in time (the 4-D), but also from gate-to-gate aircraft flight operations.

Also, electronic flight bag (EFB) solutions, which include electronic display systems for the flight deck or cabin crew member use, are gaining in popularity. For example, EFB devices can display a variety of aviation data or perform basic calculations (e.g., performance data, fuel calculations, takeoff and landing computations, etc.). In the past, some of these functions had to be manually entered using paper references or were based on data provided to the flight crew by an airline's flight dispatch function. The use of connected FMS to the cloud may alleviate the need in some instance for inputting all the aviation data needed in these EFB solutions.

Surface guidance techniques, both manual and automated, aid a pilot in parking an aircraft at an airport stand. Such systems apply visual methods, leading to the terms: Visual Docking Guidance System (VDGS) and also A-VDGS (Advanced Visual Docking Guidance System), that allow aircraft to remain clear of obstructions and ensure that Jetways can reach the aircraft. The Manual Visual Surface Guidance is achieved with the aid of ground personnel, called Aircraft Marshalls. These Aircraft Marshalls use a variety of rudimentary arm signals to indicate where an aircraft is positioned in relation to both the stop line and the centerline. For obvious reasons, like reduced visibility in different weather conditions and also varying signaling standards across countries and airports and the very limitations due to human involvement, manual techniques cannot be considered the preferred and sustained mode to provide aircraft guidance.

The Non-Manual techniques, like techniques of the Azimuth Guidance for Nose-In Stand (AGIS), are forms of stand guidance that use a combination of Red and Green Traffic Signal like lights and Parallax Aircraft Parking Aids and Mirrors to visually guide a pilot from outside the terminal area to the docking. More advanced systems like the HONEYWELL® Advanced Visual Docking Guidance Systems (A-VDGS) use dynamic-range video sensing of incoming aircraft, image processing techniques, in combination with 3D aircraft model databases to provide precise guidance information on a Pilot Display Unit (PDU), so pilots can dock the aircraft safely into the gate.

The visual surface guidance techniques described above, though effective, as can be envisioned have inherent limitations. External visual guidance systems become less effective in poor visibility and extreme weather conditions. Additionally, most of the advanced guidance systems require a combination of costly sensors, display and imaging devices and are also prone to periodic maintenance costs. Advanced Visual Guidance Systems are inherently difficult and costly to install at lower tier Airports. The Azimuth Guidance for Nose-In Stand (AGNIS), Advanced Visual Docking Guidance Systems (A-VDGS) and Aircraft Positioning and Information System (APIS++) may be used for Visual Docking Guidance aiding. However, the inherent limitations of the infrastructure requirements, costs involved, deteriorated weather use, external cockpit dependency etc. make these solutions viable only in limited environments.

Various embodiments of the present disclosure describe systems and mechanisms which can aid Aircraft Visual Guidance at an Aerodrome Gate or Stand in all weather and visibility conditions, account for the varying sizes of different aircraft equipment and those that can seamlessly incorporate ARIAC revisions to the gate information are greatly desired.

Various embodiments of the present disclosure describe techniques wherein the CAD model or 3D model of the Ownship Aircraft configured within an Airport Moving Map Application can be processed in conjunction with the Airport Mapping Database (AMDB) and provide relative Aircraft Visual Guidance Docking cues on a Digital Taxi like application.

Various embodiments of the present disclosure describe advances to the in-cockpit Digital Taxi EFB like Airport Moving Map application to process the 3D CAD or spatial or volumetric representation of the ownship aircraft shape and structure in conjunction with the embedded Airport Mapping Database to provide relative Visual Guidance Cues for terminal area gate docking operations.

Various embodiments disclosed of the present disclosure describe the Airport Mapping Databases (AMDB) as already loaded via cloud connected applications or installed locally of the Digital Taxi AMM applications. The Digital Taxi AMM applications may be further configured to receive or load and store the 3D CAD or Spatial model of the aircraft on which the AMM application is intended to be used. Alternatively, the standard data corresponding to multiple different airplane types may be loaded and stored on the AMM application. The 3D airplane model and the Airport Mapping Database may be processed in conjunction with the real-time airplane position and course to provide relative guidance cues (left, right, forward, backward etc.) to effectively align the airplane exit door or a pre-determined aircraft structural feature to the actual gate or stand information coded in the Airport Mapping Database.

Various embodiments of the present disclosure describe the AMM based Visual Docking Guidance System with software upgrades to the Digital Taxi EFB and Airport Moving Map applications to realize safety and operational benefits for terminal area aircraft guidance. The 3D CAD or Volumetric model of the target aircraft may be loaded or serviced on an as-needed basis or even be loaded along with the AMDB as a loadable data component. The navigation computers onboard an aircraft may provide precise position computation which may also be in use in conjunction with the airport moving maps for surface guidance applications. Once the gate is allocated to a specific aircraft and is made available to the Airport Moving Map application, the Visual Guidance Docking system may be activated when the aircraft is in the proximity of the docking gate or stand.

Various embodiments of the present disclosure describe the Airport Mapping data is retrieved based on the current aircraft position and the target docking station. The 3D volumetric data of the aircraft is then processed in conjunction with the Airport Mapping Data using image processing techniques with a target to accurately align the aircraft door (or any other specified structural reference) with the docking gate or stand. Based on the relative position and the direction of the aircraft motion, visual cues can be generated on the Airport Moving Map applications similar to the current electronic visual docking guidance systems to provide accurate guidance to dock an aircraft to the target airport reference structure.

The nomenclature and symbology used on an external Aircraft Visual Guidance System may be maintained on the Airport Moving Map for simplicity and familiarity. Appropriate cues indicating the required relative aircraft motion of the aircraft to eventually dock the aircraft to a target aircraft structure may be presented to the pilot. In addition, various embodiments described enable systems that do not require dependencies on equipment or display systems external to the aircraft and therefore makes all-weather applications both available and feasible.

Various embodiments enable implementation of the software in legacy systems by an upgrade to the current airport mapping application without requiring extensive modifications or installations at the airport terminal. The software methods and systems enhance safety and operational efficiency and without additional dependencies on external systems or personnel. That is, the pilot with minimum cockpit aids can safely guide and dock the aircraft by responding to the cues presented.

Various embodiments of the present disclose describe applications that provide instant gratification to the experience of executing safe aircraft visual docking guidance from within the cockpit by the reduced dependence on external systems.

Various embodiments of the present disclosure enable multi-fold benefits and advantages as follows: eliminating dependence on external personnel or Aircraft Marshalls as well as reliance on external guidance display systems and electronics where the enhanced capabilities may be realized with minimal software upgrades to the Airport Moving Map applications; all weather capability of a Visual Guidance Docking system which provides visual docking guidance cues irrespective of the prevailing environmental conditions of the day; ensuring accurate guidance and surface navigation and thereby prevent apron conflicts with other ground vehicles; changing to Airport Gate information which are automatically incorporated as the Airport Mapping Databases is periodically updated every ARIAC cycle or on need basis; eliminating the overhead of modifications and maintenance of ground guidance equipment; enabling by only upgrading Software by incorporating the aircraft 3D CAD model or spatial mesh model of ownship or all aircraft into the Airport Moving Map applications which can be monetized by incorporating Aircraft Database as additional upgrades to the Airport Mapping Databases (AMDB); scalability to multiple different aircraft types and airports; utilizing airport information which is already coded in the AMDB; configuring only additional ownship aircraft 3D models into the database or made available to the Digital Taxi application; and potential monetizing of the Aircraft Visual Docking Guidance Capabilities using a Software as a Service (SaaS) model wherein subscribed users will be charged for enabling the capabilities.

In various exemplary embodiments, a Digital Taxi Application or Airport Moving Map System (AMM) are Synthetic View display applications which overlay on the display, airport features like runways, taxiways, aprons, ground traffic, airport structures etc. Synthetic View display systems typically combine high resolution displays, with precision databases of terrain and obstacle data, geo-political, hydrological and other databases, and aeronautical information, data feeds from other aircraft and vehicles, and GPS technology to show pilots exactly where they are and how the aircraft is orientated. The Taxi-Wizard and Airport Moving Map displays are computer-mediated reality systems for airborne and ground systems which provide flight crews with clear, intuitive and unprecedented situational awareness of their flying and on-ground surface movement environment by depicting 3D representations of the external surroundings outside the aircraft. The backbone of the Digital Taxi and Airport Moving Map systems is an underlying detailed, high-resolution digital Airport Mapping Database (AMDB).

In an exemplary embodiment, the 3D mesh model or volumetric depiction of an aircraft may be published by the equipment manufacturer or derived from the equipment specifications. The 3D volumetric mesh model can be quantified as a combination of multiple polygons in 3D space. 3D models of all airframe types can be aggregated and made available to the system of the proposed invention (stored in the AMDB or configured based on need for each aircraft). The AMDB and the 3D spatial data derived from the vehicle manufacturer specifications become the primary source of the 3D spatial data. Appropriate parts of the airframe structure may be selected as docking reference positions; for example, the front door of the aircraft may be configured as the docking reference point on the airframe structure. The logic of the specified visual guidance docking system will process the Aircraft spatial model in conjunction with the gate information retrieved from the Airport Mapping Database to provide appropriate guidance cues and accurately guide the aircraft to the gate or stand.

In various embodiments, the Digital Taxi EFB can provide visual cues, aural or message alerts to the pilots based on the 3D spatial data processing of the Aircraft model and the Gate/Stand information retrieved from the Airport Mapping Database. The symbology used and the figures depicted below are only exemplary in nature and one should appreciate the fact that alternate representations and symbology are possible.

The Digital Taxi can provide Visual Guidance Docking cues with no or limited dependencies on external sources as a cost effective solution greatly enhancing the safety and efficiency of the docking maneuvers. With minimal additional configuration data of the ownship 3D volumetric model in conjunction with the Airport Moving Map Database (AMDB), it is possible to provide efficient gate or stand docking capabilities on Airport Moving map applications. The aircraft visual docking applications are easily scalable for multiple different aircraft types and airports across the world with very little or no upgrades to the Airport Moving Map applications and is applicable and extendable to both the General and Commercial Aviation segments. Upgrades to the Airport Moving Map databases to incorporate and tailor the 3D spatial coding of the different equipment and aircraft models can also be implemented.

With increased burdens placed on the pilot and crew during aircraft operations, there may be a resultant increase in human errors due to a number of factors which include: non-coordinated cockpit system messages, poor external visibility, fatigue, lack of position awareness, misunderstood ATC clearances, multiple or conflicting ATC clearances, or inadvertent flight deck distractions. Connected applications such as an aircraft visual docking guidance system may be used to counter such affects. For example, data sets for airport moving maps and aircraft models can be used in conjunction with avionic control systems for a host of applications to aid the pilot in flight operations with systems that include but are not limited to the cockpit display systems, Flight Management Systems, Enhanced Ground Proximity Warning System (EGPWS), Traffic Collision Avoidance System TCAS, Weather or RADAR Systems, EFB devices, etc.

Also, the pervasive use of personal electronic devices and complex systems such as the flight deck systems provides an opportunity for improving performance using interactive prediction models and cloud applications such via the connected FMS for the visual guidance docking system.

FIG. 1 depicts a block diagram of an exemplary aircraft navigation and control system, in accordance with the disclosed embodiments. FIG. 1 is a functional block diagram of an avionics display system 20 in accordance with an exemplary embodiment. The avionics display system 20 includes at least one processor 22 and at least one monitor 24, which is operatively coupled to processor 22. During the operation of the avionics display system 20, the processor 22 drives the graphics module 27 which, in conjunction with processor 22, drives the monitor 24 to produce a graphics display 26 that visually provides the pilot and flight crew with information pertaining to the aircraft. The processor 22 includes a speech recognizer 11 and may be used to provide the functions of the speech recognizer 11. The speech recognizer 11 may convert received speech transmissions to text as well as perform appending of text and concatenating of text messages with system messages. The speech recognizer 11 may perform natural language processing ("NLP") of received audio or voice transmission as well as monitoring of broadcasts and transmissions for conversion to text and further processing by the processor 22. The speech recognizer 11 may perform or assist the processor 22 in performing functions related to contextual interpretations and aggregations of the received broadcasted and transmitted voice transmissions. These transmissions may include transmissions as well as broadcasts from the ATC and aeronautical operation control ("AOC") to the aircraft or other aircrafts. The graphics display 26 may include visual representations of one or more flight characteristics pertaining to a neighboring aircraft, as described more fully below.

The processor 22 may generate a graphics display 26 in a two-dimensional format (e.g., as a lateral or vertical profile map display) or in a hybrid format (e.g., in a picture-in-picture or split screen arrangement) and may be incorporated into all display units capable of displaying cockpit data; e.g. the primary flight display, the multi-function display, and the interactive navigation display. The processor 22 may generate aural and audio messages to an audio output device 40 that provides the pilot and flight crew with information pertaining to the aircraft. An audio capture device 42 may also be included. This audio capture device 42 may capture aural alerts from other systems of the aircraft or from pilot communications for transmission to and processing by the processor 22.

The processor 22 may be in operable communication with the terrain database 108, the graphical airport features database 109, the navigation database 110, and the display element 106, and is coupled to receive various types of data, information, commands, signals, etc., from the various sensors, data sources, instruments, and subsystems described herein. For example, the processor 22 may be suitably configured to obtain and process real-time aircraft status data (e.g., avionics-related data) as needed to generate a graphical synthetic perspective representation of terrain in a primary display region. The aircraft status or flight data may also be utilized to influence the manner in which graphical features (associated with the data maintained in the graphical airport features database 109 or retrieved from the cloud) of a location of interest such as an airport are rendered during operation of the aircraft. For the exemplary embodiments described here, the graphical airport features database 109 may be considered to be a source of airport feature data that is associated with synthetic graphical representations of one or more airport fields.

In certain embodiments, the processor 22 may be configured to respond to inertial data obtained by the onboard sensors 36 to selectively retrieve terrain data from the terrain database 108, or the terrain sensors 128 to selectively retrieve navigation data from the navigation database 110, and/or to selectively retrieve graphical features data from the graphical features database 109, where the graphical features data corresponds to the location or target of interest. The processor 22 can also supply appropriate display commands (e.g., image rendering display commands) to the display element 106, so that the retrieved terrain, navigation, and graphical features data are appropriately displayed on the display element 106. The processor 22 also provides appropriate commands to aural annunciator 105 (e.g. aural alert generating commands including those related to runway and taxiway alerts). The processor 22 may be further configured to receive real-time (or virtually real-time) airspeed, altitude, attitude, waypoint, and/or geographic position data for the aircraft and, based upon that data, generate image rendering display commands associated with the display of terrain.

The user input device 21 is in operable communication with the processor 22 and is configured to receive input from a user (e.g., a pilot) and, in response to the user input, supply command signals to the processor 22. The user input device 21 may be any one, or combination, of various known user interface devices including, but not limited to, a cursor control device (CCD), such as a mouse, a trackball, or joystick, one or more buttons, switches, or knobs. In the depicted embodiment, the user input device 21 includes the CCD and a keyboard. The user manipulates the CCD to, among other things, move cursor symbols that might be rendered at various times on the graphics display 26, and the user may manipulate the keyboard to, among other things, input textual data. As depicted in FIG. 1, the user input device 21 may also be utilized to enable user interaction with the navigation computer 111, the lateral guidance system 16, and/or other features and components of the aircraft.

The processor 22 may include, or be associated with, any suitable number of individual microprocessors, flight control computers, navigational equipment, memories, power supplies, storage devices, interface cards, and other standard components known in the art. In this respect, the processor 22 may include or cooperate with any number of software programs (e.g., avionics display programs) or instructions designed to carry out the various methods, process tasks, calculations, and control/display functions described below, for example, processor 22 may be included within a Flight Management Computer (FMC) of the type commonly deployed within a Flight Management System (FMS). The processor 22 may carry out functions associated with parsing, transcribing, aggregating and appending aural and text messages received by various inputs to the aircraft or from internal systems of the aircraft. The processor 22 with the speech recognizer 11 may include applications and solutions to perform natural language processing (NLP) of inputs of aural alerts to convert the aural alerts to text alerts. The conversion may include aural alerts consistent in structure with the message alert for aggregating together with the message alert to form a concatenated message alert type. The NLP may be applied with context based attributes based on applications of the processor 22 with the speech recognizer 11 to determine a context of the aural alert by matching with a set of context attributes prior derived for the particular aircraft and stored locally in memory of the processor 22 or memory 55.

The image-generating devices suitable for use as monitor 24 include various analog (e.g., cathode ray tube) and digital (e.g., liquid crystal, active matrix, plasma, etc.) display devices or embedded cockpit displays or mobile display systems like EFBs or smart phone displays. In certain embodiments, monitor 24 may assume the form of a Head-Down Display (HDD) or a Head-Up Display (HUD) included within an aircraft's Electronic Flight Instrument System (EFIS). The monitor 24 may be disposed at various locations throughout the cockpit. For example, the monitor 24 may include a primary flight display (PFD) and reside at a central location within the pilot's primary field-of-view. Alternatively, the monitor 24 may include a secondary flight deck display, such as an Engine Instrument and Crew Advisory System (EICAS) display, mounted at a location for convenient observation by the aircraft crew but that generally resides outside of the pilot's primary field-of-view. In still further embodiments, monitor 24 may be worn by one or more members of the flight crew.

The graphics display 26 is used to display various images and data, in both a graphical and a textual format, and to supply visual feedback to the user in response to the user input commands supplied by the user to the user input device 21. In an exemplary embodiment, the graphics display 26 includes a panel display, and the graphics display 26 is suitably configured to receive image rendering display commands from the processor 22 and, in response thereto, the graphics display 26 renders a synthetic graphical display having a perspective view corresponding to a flight deck viewpoint. In certain situations, the graphics display 26 receives appropriate image rendering display commands and, in response thereto, renders a synthetic representation of an airport field. The graphically rendered airport field might include conformal graphical representations of taxiways, runways, and signage rendered on the taxiways.

The processor 22 includes one or more inputs operatively coupled to one or more air traffic data sources. In the exemplary embodiment illustrated in FIG. 1, the air traffic data sources include a wireless transceiver 28 and a navigation system 30 and The navigation system 30 includes an on-board radar 32 and various other on-board instrumentation 34 The avionics display system 20 provides the display information to the pilot or flight crew in a highly intuitive manner. For this exemplary embodiment, the avionics display system 20 includes the processor 22 connected to a database 14, a lateral guidance system 16, a navigation system 30, a graphics module 27, and a graphics display 26. Further, it is contemplated that while the avionics display system 20 appears in FIG. 1 to be arranged as an integrated system, the present disclosure is not intended to be so limited and may also include an arrangement whereby one or more of processer(s) 22, database 14, lateral guidance system 16, navigation system 30, graphics module 27, and graphics display 26 is a separate component or a subcomponent of another system located either onboard or external to an aircraft.

Also, for example, avionics display system 20 may be arranged as an integrated system (e.g., aircraft display system, Primary Flight Display system, etc.) or a subsystem of a more comprehensive aircraft system (e.g., flight management system, navigation and control system, target aiming and control system, collision alert and/or avoidance system, weather avoidance system, etc.). Furthermore, the present disclosure is not limited to aircraft displays, and may also be implemented for other types of vehicles' electronic displays (such as, for example, spacecraft navigation displays, ship navigation displays, submarine navigation displays, train navigation displays, motor vehicle navigation displays, etc.).

The database 14 may also include, for example, a terrain database, which may include the locations and elevations of natural terrain obstacles such as mountains or other elevated ground areas, and also the locations and elevations of man-made obstacles such as radio antenna towers, buildings, bridges, etc. As another example, airport and runway location data, and other types of high priority target data (e.g., locations of incoming traffic to avoid, constructed waypoints, obstacles in the aircraft's flight path, etc.) may be retrieved and/or received by processer 22 from a suitable source of such data, such as, for example, an onboard flight management system database (e.g., a component of lateral guidance system 16), an onboard navigation database (e.g., a component of navigation system 30), on-board sensors 36 or the on-board radar 32, or an external database (e.g., via a data communication up-link). Also, onboard the aircraft, the database 14 can include a navigational database, a weather database, a historical trend database, and/or a runway database, such as an Enhanced Ground Proximity Warning System ("EGPWS") runway database.

The aircraft may be any aviation vehicle that uses a lateral guidance 16 as a primary user interface for flight crew guidance with the avionics display system 20 onboard the aircraft. The one or more avionics systems may include a Flight Management System (FMS), aircraft interface device (AID) or the like. Data obtained from the one or more avionics systems may include, without limitation: flight plan data, aircraft state data, weather data, brake system data, fuel and weights data, runway analysis data, aircraft performance data, or the like.

The memory 55 can be external to and operatively coupled to processing unit or, instead, integrated into processer 22. In one embodiment, a processor and memory of the processer 22 reside in an Application Specific Integrated Circuit ("ASIC"). Memory 55 may store data, such as various software or firmware, supporting operation of processer 22 and other components included in avionics display system 20, such as graphics system, sensor system, and the source of aircraft state data. Additionally, the memory 55 may store one or more onboard databases or be connected to the database 14.

The processor 22 and a graphics module 27 cooperate to display, render, or otherwise convey one or more graphical representations, synthetic displays, graphical icons, visual symbology, or images associated with operation of avionics display system 20 on graphics display 26. An embodiment of an avionics display system 20 may utilize existing graphics processing techniques and technologies in conjunction with graphics module 27. Graphics module 27 is suitably configured to support well-known graphics technologies and display techniques including (i) synthetic vision, (ii) enhanced vision, (iii) combined vision, and (iv) compressed attitude.

Graphics display 26 may include any image-generating device or devices capable of producing one or more navigation displays of the types described herein. As a point of emphasis, the term "display device" encompasses display devices (image-generating devices) fixed to the aircraft (A/C) cockpit, as well as Electronic Flight Bags ("EFBs") and other portable display devices that may be carried by a pilot into the cockpit of an A/C and perform the below-described functions. For example, the graphics display 26 may implement one or more of a multi-function display (MFD), a three-dimensional MFD, a primary flight display (PFD), a synthetic vision system (SVS) display, a vertical situation display (VSD), a horizontal situation indicator (HSI), a traffic awareness and avoidance system (TAAS) display, a three-dimensional TAAS display, just to name a few. Moreover, the display may be implemented with multiple types of a graphic display 26, each of which may implement one or more of these different, non-limiting displays. No matter the number or particular type of display that is used to implement the graphic display 26, it was noted above that the graphic display 26 is responsive to the image rendering display commands it receives to render various images. The images that the graphic display 26 renders will depend, for example, on the type of display being implemented.

The graphic display 26 may also consider input data received via user input device 21 when performing the above-described functions. In this regard, user input device can include any number and type of input devices suitable for receiving pilot input, which may be distributed throughout the cockpit of an aircraft (A/C) and possibly included in other systems or subsystems. In one embodiment, user input interface assumes the form of or includes the alphanumeric keypad of an FMS.

The processor 22 is configured, upon receipt of data and information, to continuously process the information to identify the predictive tracking angle, roll, pitch, and yaw for the aircraft A/C, and to generate a symbolic form representative thereof. The symbolic form is an aircraft orientation cue to be displayed on the graphic display 26, and the dimensions of the symbolic form vary predictably to indicate, respectively dimensions of the aircraft.

Within other on-board instrumentation 34, each sensor may include one or more sensor technologies, devices, instruments (such as on-board radar, radar altimeter, a global positioning system (GPS)), and software, sufficient for detecting and providing aircraft A/C status data (including speed, location, position, remaining fuel, faults, conditions, and detected weather and temperature).

Figure 2:
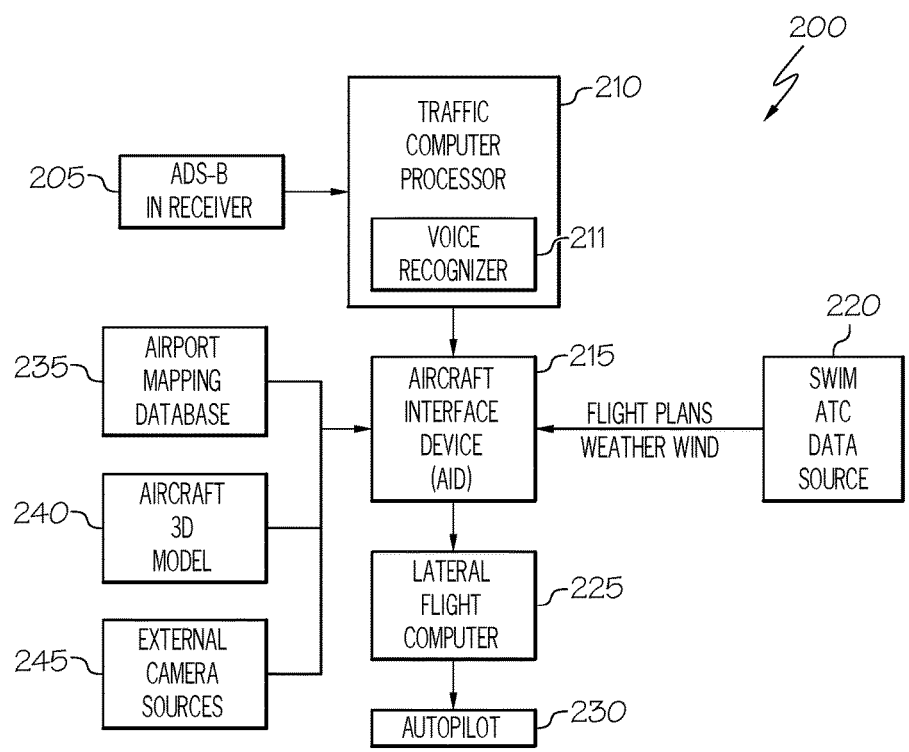
FIG. 2 is a block diagram of a system suitable for use in an aircraft in accordance with the exemplary embodiments described herein.

FIG. 2 depicts a block diagram of an exemplary aircraft navigation and control system for use with speech recognition, in accordance with the disclosed embodiments. FIG. 2 includes an automatic dependent surveillance broadcast (ADS-B) receiver 205 which is an integral component of NextGen national airspace strategy where the aircraft receives flight information services-broadcast (FIS-B) and traffic information services broadcast (TIS-B) data and other ADS-B data such as direct communication from nearby aircraft at a traffic computer 210. The traffic computer 210 receives the ADS-B in and generates the target aircraft state parameters to an aircraft interface device (AID) 215. The traffic computer 210 may also include processors of a voice recognizer 211 for speech recognition and may provide voice recognize functions to convert voice transmissions to text. In addition, the voice recognizer 211 may include solutions for semantic contextual interpretations of the voice transmissions and for appending and aggregating to other text messages or flight data. For example, functions and solutions of the voice recognizer 211 together with functions and solutions of the traffic computer 210 may be used to match aural and text messages, concatenate aural and text messages, and append or aggregate in similar or same structures pairs of aural transformed messages with text messages. Also, the AID 215 receives the flight data, weather, wind as well as inputs received from a System Wide Information Management/Air Traffic Control (SWIM/ATC) data source 220. The aircraft interface device (AID) 215 is coupled to the lateral guidance computer 225. The airport mapping database 235 as well as the airport 3D modeling database 240 and external camera image inputs 245 are coupled to the AID 215 for receiving data for integrating in the visual guidance docking systems integrated or embedded with the lateral guidance computer 225.

Also, it is contemplated that in an Internet of Things environment many of the participating systems may be connected to each other and additional systems connected or interconnected could be easily added or removed.

Figure 3:
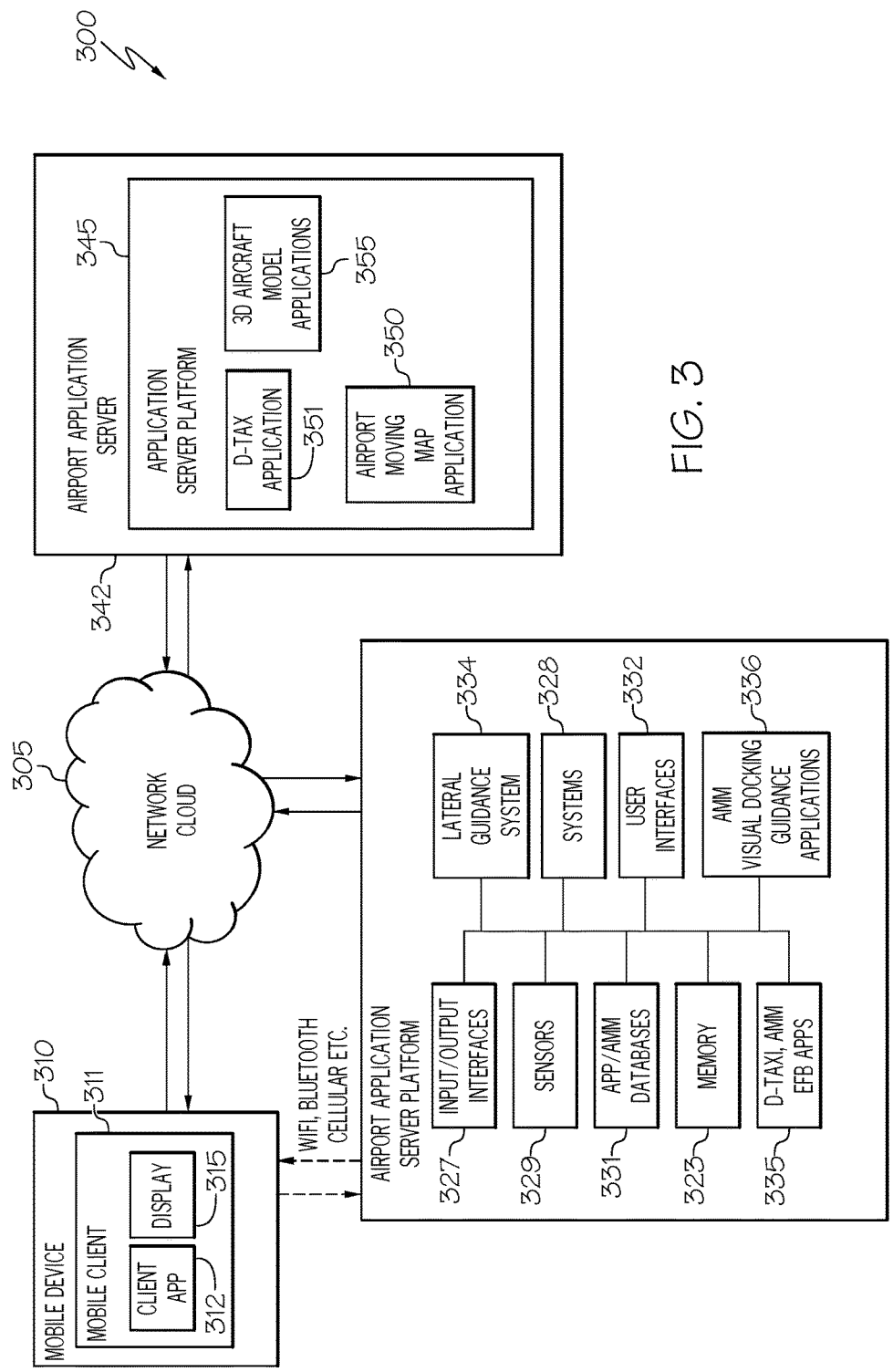
FIG. 3 is diagram of visual aircraft guidance docking system in accordance with the exemplary embodiments described herein.

FIG. 3 is diagram of a client app coupled to a cockpit application platform and a server application platform of aircraft visual guidance system 300 in accordance with the exemplary embodiments.

FIG. 3 includes the mobile device 310 configured on a mobile platform 311 with a client app 312 having a display 315 for displaying the visual cue guidance data and instructions to the pilot. The visual guidance docking system of the aircraft may include visual guidance docking applications 320 on an aircraft applications docking platform 325 having input/output interfaces 327 to various external sensors and terrain sensors from sensors 329 of the aircraft for processing. In addition, receiving inputs from positioning systems and navigation systems of aircraft systems 328. Further, the aircraft applications docking platform 325 may include app databases 331 such as the AMM app database, user interfaces 332 for changing displays and captured images, memory 323 for configuring user settings, views, alignment instructions, local processors which may be part of the lateral guidance system 334, AMM visual docking guidance applications 336, and other Digital Taxi, AMM, EFB and other related apps 335. The aircraft visual guidance system 300 via the aircraft applications docking platform 325 is connected via the network 305 to the an airport or source server system. In an exemplary embodiment, the airport application server 342 may be configured with an airport application platform 345 which may include Digital Taxi applications 351, AMM database 350 and volumetric model applications 355 for retrieving and downloading by the aircraft applications docking platform 325. It is contemplated that the application configuration may be reconfigured in a multitude of ways with the various databases and applications pre-loaded, locally stored or remotely stored at various servers. The use of an airport application server 340 is simply one such configuration and should not be construed as limiting any variety of alternative server, local and client configurations.

For example, in alternate exemplary embodiments, the client app 312 may be integrated in the cockpit display as well as with the mobile device 310. The display 315 may display a CAD model or 3D model of the Ownship Aircraft configured within an Airport Moving Map Application processed locally using various processors of the mobile device, the aircraft or processed remotely at the airport application server 340 in conjunction to the Airport Mapping Database (AMDB) and provide relative Aircraft Visual Guidance Docking cues on a Digital Taxi like application within the client app 312 or another app on the mobile platform 311. The mobile device 310 as well as the aircraft applications docking platform 325 may have the in-cockpit Digital Taxi application like the Airport Moving Map application integrated or coupled to process the 3D CAD or spatial or volumetric representation of the ownship aircraft shape and structure in conjunction with the embedded Airport Mapping Database and further may provide relative Visual Guidance Cues for terminal area gate docking operations. In some instances, the in-cockpit Digital Taxi like Airport Moving Map applications of related apps 335 may process the 3D CAD or spatial or volumetric representation of the ownship aircraft shape and structure in conjunction with the embedded Airport Mapping Database of the app databases 331 using processors locally at the aircraft or remoted processers at the airport application server 340 and received via the network 305 to provide relative Visual Guidance Cues for terminal area gate docking operations.

Data from the Mapping Databases (AMDB) may be loaded via cloud connected applications to AMM App database of the app databases 331 and installed locally with the Digital Taxi AMM applications of the related apps 335. The Digital Taxi AMM applications of the related apps 335 may be further configured to receive or load and store the 3D CAD or Spatial model of the Aircraft on which the AMM application is intended to be used. Alternatively, the standard data corresponding to multiple different airplane types may be loaded and stored on the AMM application of the related apps 335. The 3D airplane model and the AMM Database 350 may be processed in conjunction with the real-time airplane position and course to provide relative guidance cues (left, right, forward, backward etc.) to effectively align the airplane exit door or a pre-determined aircraft structural feature to the actual gate or stand information coded in the AMM Database 350.

The AMM Visual Docking Guidance applications 336 may receive software upgrades from the D-Taxi applications 351 and Digital Taxi Airport connected to the AMM database 350 to realize safety and operational benefits for terminal area aircraft guidance. The 3D CAD or Volumetric model applications 355 of the target aircraft may be loaded or serviced on an as-needed basis or even be loaded along with the AMDB as a loadable data component to the AMM visual docking guidance applications 336. The navigation computers onboard of the lateral guidance system 334 of the aircraft may provide precise position computation which may also be used in conjunction with the airport moving maps for surface guidance applications. Once the gate is allocated to a specific aircraft and is made available the Airport Moving Map application of the related apps 335, the AMM Visual Docking Guidance applications 336 may be activated when the aircraft is in the proximity of the docking gate or stand.

The Airport Mapping data from the AMM database 350 or related apps 335 is retrieved based on the current aircraft position and the target docking station. The 3D volumetric data from volumetric model applications 355 of the airplane is then processed in conjunction with the Airport Mapping Data using image processing techniques with a target to accurately align the aircraft door (or any other specified structural reference) with the docking gate or stand. Based on the relative position and the direction of the aircraft motion, visual cues can be generated on the Airport Moving Map applications similar to the current electronic visual docking guidance systems can provide accurate guidance to dock an aircraft to the target airport reference structure.

The AMM Visual Docking Guidance applications 336 provides visual docking guidance cues irrespective of the prevailing environmental conditions of the day because the guidance cues are not based on data from the ownship sensors; ensuring accurate guidance and surface navigation and thereby prevent apron conflicts with other ground vehicles; changing to Airport Gate information which are automatically incorporated as the Airport Mapping Databases of the app databases 331 is periodically updated every ARIAC cycle or on an as-needed basis; eliminating the overhead of modifications and maintenance of ground guidance equipment; enabling by only upgrading Software by incorporating the aircraft 3D CAD model or spatial mesh model of ownship or all aircrafts into the Airport Moving Map applications of related apps 335 which can be improved periodically by incorporating Aircraft Database as additional upgrades to the Airport Mapping Databases (AMDB). The scalability to multiple different aircraft types and airports; utilizing airport information which is the AMDB and may store the aircraft 3D model information or in a separate data or database be loaded to access the aircraft 3D or mesh model. External image capture devices may be used to augment synthesized views of the externa operating environment.

In an exemplary embodiment, the lateral guidance system 334 as well as applications related to the docking guidance system may be connected via the network 305 to remote servers including the airport application server 340, and do not have to remain in an active mode during the entire flight operation but can be actuated from a sleep mode to an active mode when needed. By having the active and inactive modes, processing bandwidth is limited as background processing of the data set is not required when using the connected FMS or other applications.

Figure 4A:
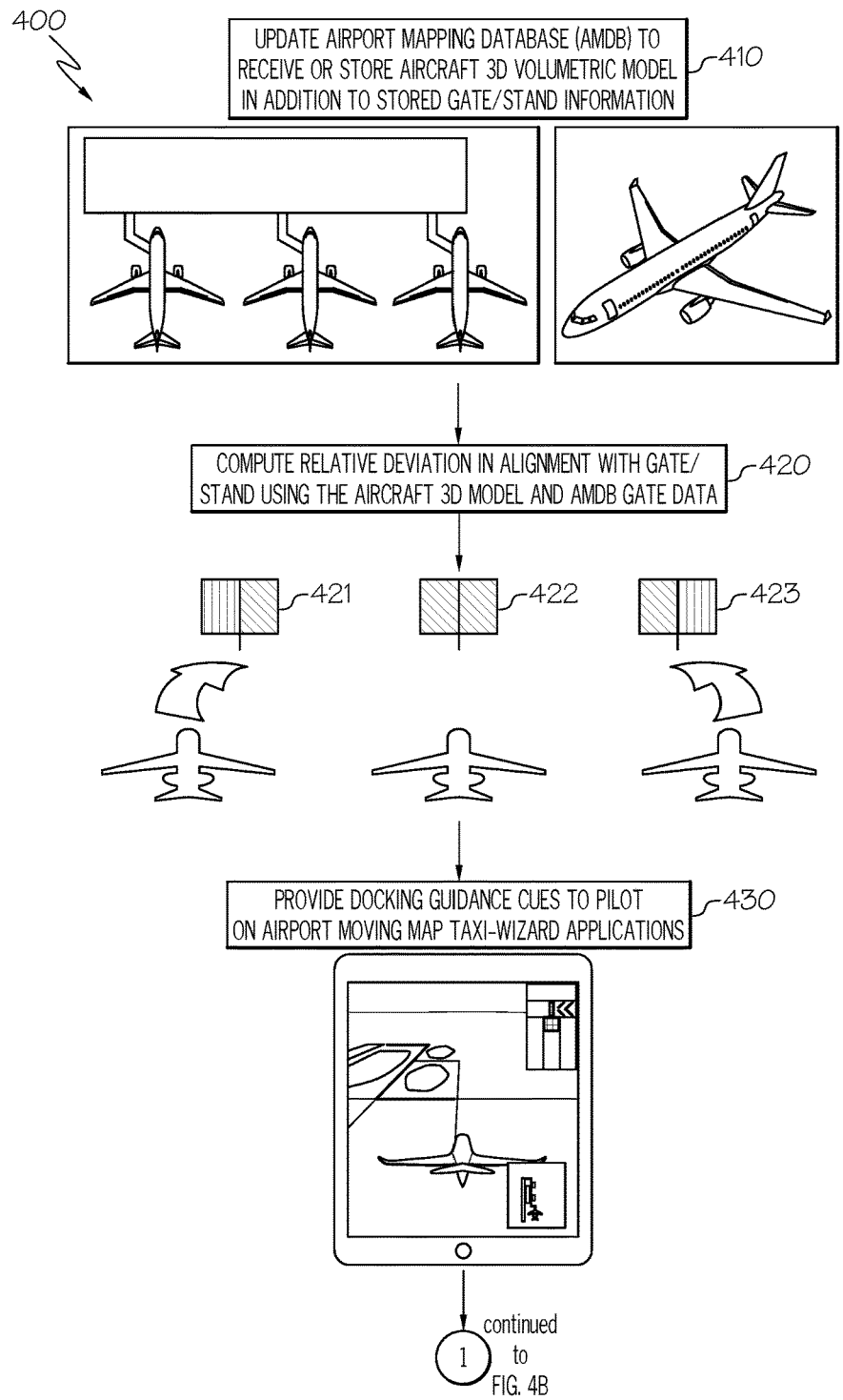
FIGS. 4A and 4B are diagrams of the airport mapping database (AMDB) with the 3D volumetric model of the aircraft visual guidance docking system in accordance with the exemplary embodiments described herein.
Figure 4B:
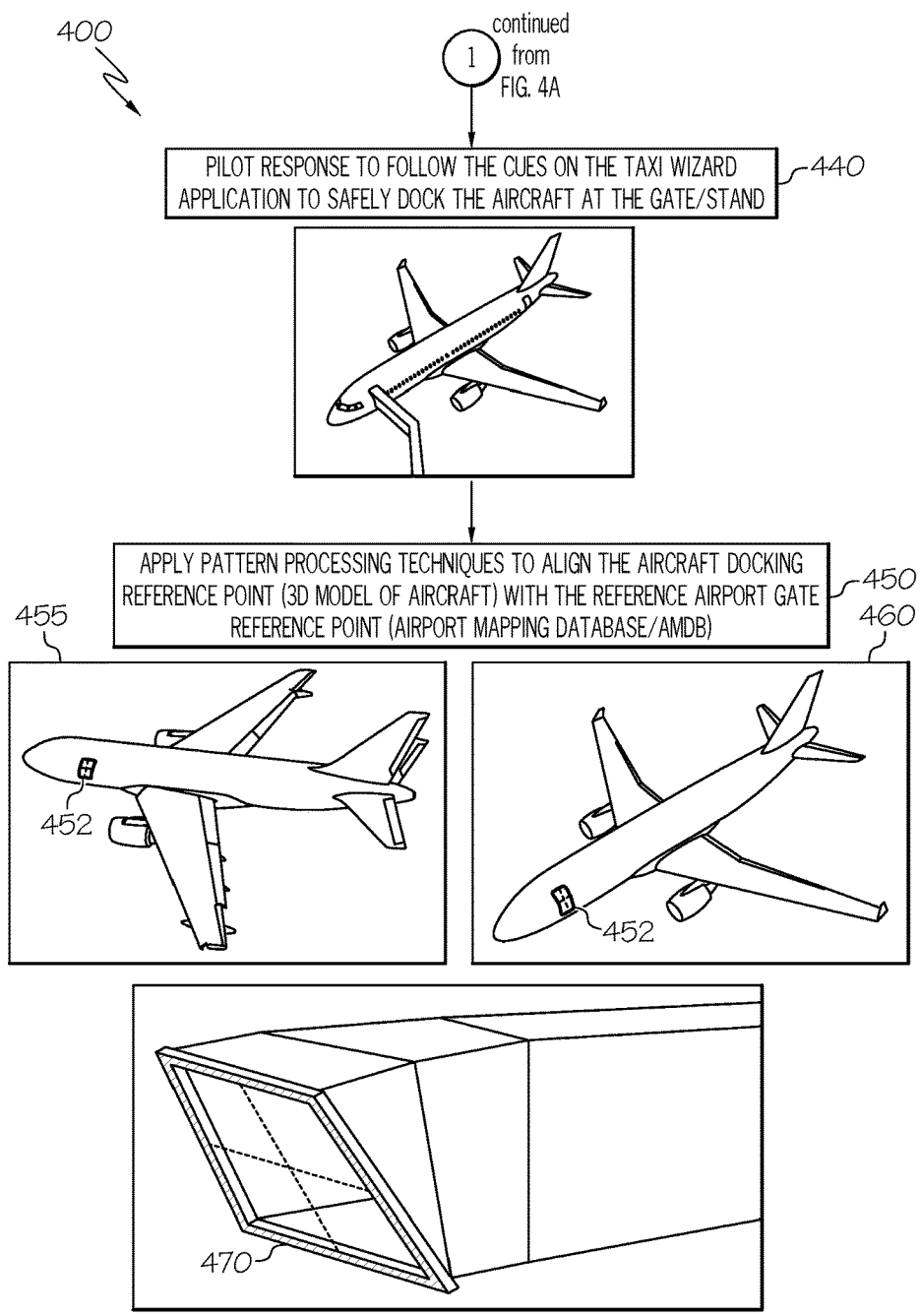

FIGS. 4A and 4B are flow diagrams of the airport mapping database (AMDB) with the 3D volumetric model of the aircraft in accordance with the exemplary embodiments. In FIGS. 4A and 4B, at task 410 upon actuating the aircraft visual guidance docking system, updates to the airport mapping database (AMDB) of the aircraft 3D volumetric model as well as the additional information may be stored locally with the appropriate gate may be provide. That is, 3D volumetric mesh model quantified as a combination of multiple polygons in 3D space as well as the similar 3D models of all airframe types can be aggregated and stored in the AMDB or configured based on need for each aircraft may require updating on an ad-hoc basis to ensure the appropriate level of precision. In addition, the Moving Map System (AMM) which is the Synthetic View display applications which overlay on the display, airport features like runways, taxiways, aprons, ground traffic, airport structures etc. also require updates when changes are incurred in the airport topology. Next, at 420, the processor locally within the aircraft or remotely at the server may compute the relative deviation in alignment with the gate/stand using the aircraft 3D model and the AMDB gate data. That is, by various applications performing computations of scaling and aligning of the aircraft from data of positions, and locations of the aircraft as well as the location of a docking point to a reference point to dock on the gate of the terminal can be computed and displayed in guidance displays on a cockpit display.

At task, 425, displays of various maneuvers to guide the aircraft in the right docking position are shown. In an exemplary embodiment, an indication of the pilot to move the plane in the right direction is shown as a digital display 421 with a red and green marker. These digital displays are composed of green and red display elements indicating cues to the pilot which direction to move. For example, to proceed straight is shown by an display 422 of two side-by-side green elements. To move left is shown by an display 423 of a green on the left and red on the right display element. While the displays are shown as digital indicators, analog displays may also be used. In addition, displays composed of multiple stacked cells indicating cues of different magnitudes, or more movements in either directions may also be used. It is contemplated that the cue indicators may be a variety of maneuver assist cues including voiced cues, and area displays of different colors indicating distances to move. In addition, automated suggestions may incorporated or displayed to the pilot as to how to maneuver the controls or how much thrust or additional thrust may be required. Finally, audible type of alarms may be used to indicate maneuver that are correct, maneuvers that are over compensating or maneuvers that are in the wrong directions. The audible cues or voiced cues can be adjusted for changes in magnitude and for indicating dangers sensed. In addition, data may be received from external sensors which may include block data for sensing and determining obstacles in the vicinity of the aircraft. In various embodiments, sensor data may be derived from optical, lidar, and acoustic radar sensors to sense objects in the vicinity of the aircraft.

At task 430 docking guidance cues may be visually provided to the pilot on the airport moving map Digital Taxi applications. That is, the docking cues to the pilot may be layered on the AMM Taxi-wizard applications that enable the pilot to view a 3D view of the docking operation. The 3D view would include views of the aircraft in the front, side and rear and enable the pilot to visually judge the required maneuver. The views could be scaled with different levels for scaling and allow for pilot controls of wider ranges of movement for finer maneuvers or alternately courser maneuvers with appropriate levels of pilot control movements. In addition, synthetic views of the docking reference point in relation to the plane may be shown so the pilot can judge the needed distances of movement to dock.

At task 440 responses for the pilot to follow the cues are assessed on the Digital Taxi application to enable safely docking the aircraft to the gate and the stand. For example, processors of the aircraft guidance system may use various applications to compute trajectories dynamically in relation to the aircraft's last position and the needed reference position and provide feedback of the actual aircraft motion toward these theoretical computed trajectories. If the pilot were to make a maneuver that is outside an accepted area of tolerance, the pilot would be alerted that the pilot is not in align with the computed trajectory to complete a safe docking maneuver. Alternately, if a response is correctly in align with a computed trajectory, the pilot would be alerted that the course of action taken is correct and there is no deviation off-course.

At task 450, pattern matching applications are executed by the processor to enable the aligning of aircraft docking reference points designated in the 3D model of the aircraft with the reference airport gate reference points designated from the airport mapping data base. For example, The AMDB and the 3D spatial data derived from the vehicle manufacturer specifications, the primary source of the 3D spatial data used as docking reference positions; for example, as depicted in the airframe structures, the front door 452 of the aircraft 455, and the aircraft 460 may be configured as the docking reference point on the airframe structure to the airport gate reference 470. The aircraft 455 is shown with a side perpendicular perspective of a 3D model of the aircraft with a designated docketing reference point or region of the aircraft. The aircraft 460 is shown with an angular front left perspective of a 3D model of the aircraft with a designated docketing reference point or region of the aircraft. The applications of the aircraft guidance systems including the pattern matching applications will process the Aircraft spatial model in conjunction with the Gate information retrieved from the Airport Mapping Database to provide appropriate guidance cues and accurately guide the aircraft to the Gate or Stand.

Figure 5:
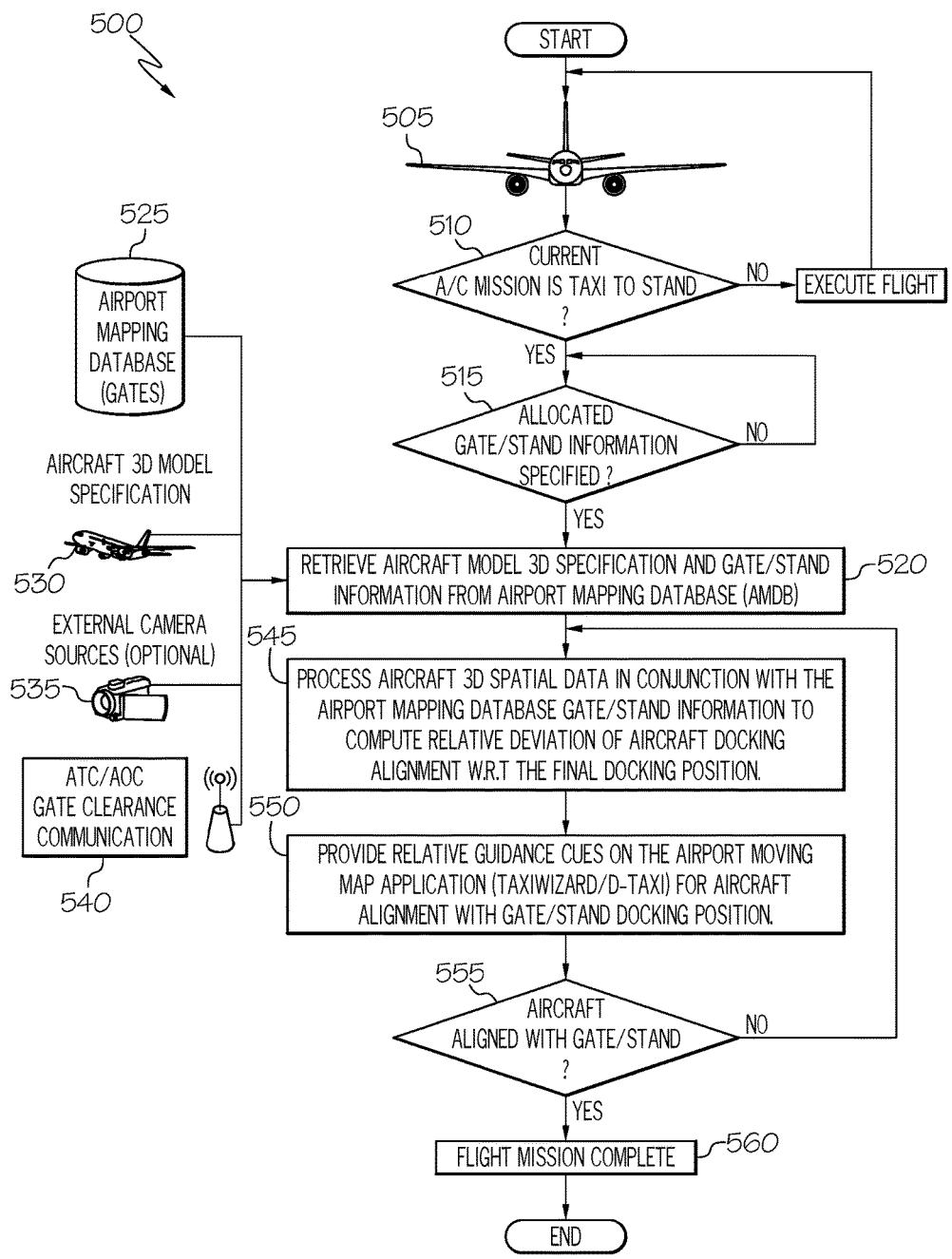
FIG. 5 is a diagram of the aircraft visual docketing system in accordance with an exemplary embodiment described herein.

FIG. 5 is an illustration of the operation of the aircraft visual docking system 500 in accordance with an exemplary embodiment. Initially at 505, a particular aircraft executes a flight plan and is in a particular stage of the flight. At 510, the pilot is either instructed or not to taxi or stand. At 510, if the pilot is given neither of the instructions, then the flow reverts to monitoring or executing the flight. If the pilot is instructed to the current A/C mission is to Taxi or to stand, then the flow proceeds to 515. At 515, the pilot is either instructed to a gate that has been allocated or stand information is specified to the pilot. At 515, if the stand information has been specified, then the aircraft visual docking system retrieves the aircraft 3D model specifications and the gate/stand information from the airport mapping database (AMDB). That is, the aircraft visual guidance docking system may retrieve via a server from the airport mapping database 525 the gate information and related data, the aircraft model specifications, additional images from external camera sources 535, and the ATC gate clearance communications. The aircraft visual docking systems at 545 would sync or process the retrieved information by layering the information onto AMM applications. That is, the aircraft 3D spatial data in conjunction with the airport mapping database gate/stand information using various applications, would compute relative deviations of aircraft docking alignments, aircraft trajectories, and aircraft positioning, with respect to the final desired docking position. At 550, guidance cues would be provided by display and aural annunciations on the airport moving map application (via the Digital Taxi) for the appropriate aircraft alignment with gate/stand docking. At 555, the aircraft visual docking system would make a determination with the aircraft if aligned and the docking operation is complete. At 560, the aircraft visual docking system would provide an indication to the pilot that the docking is complete.

Figure 6:
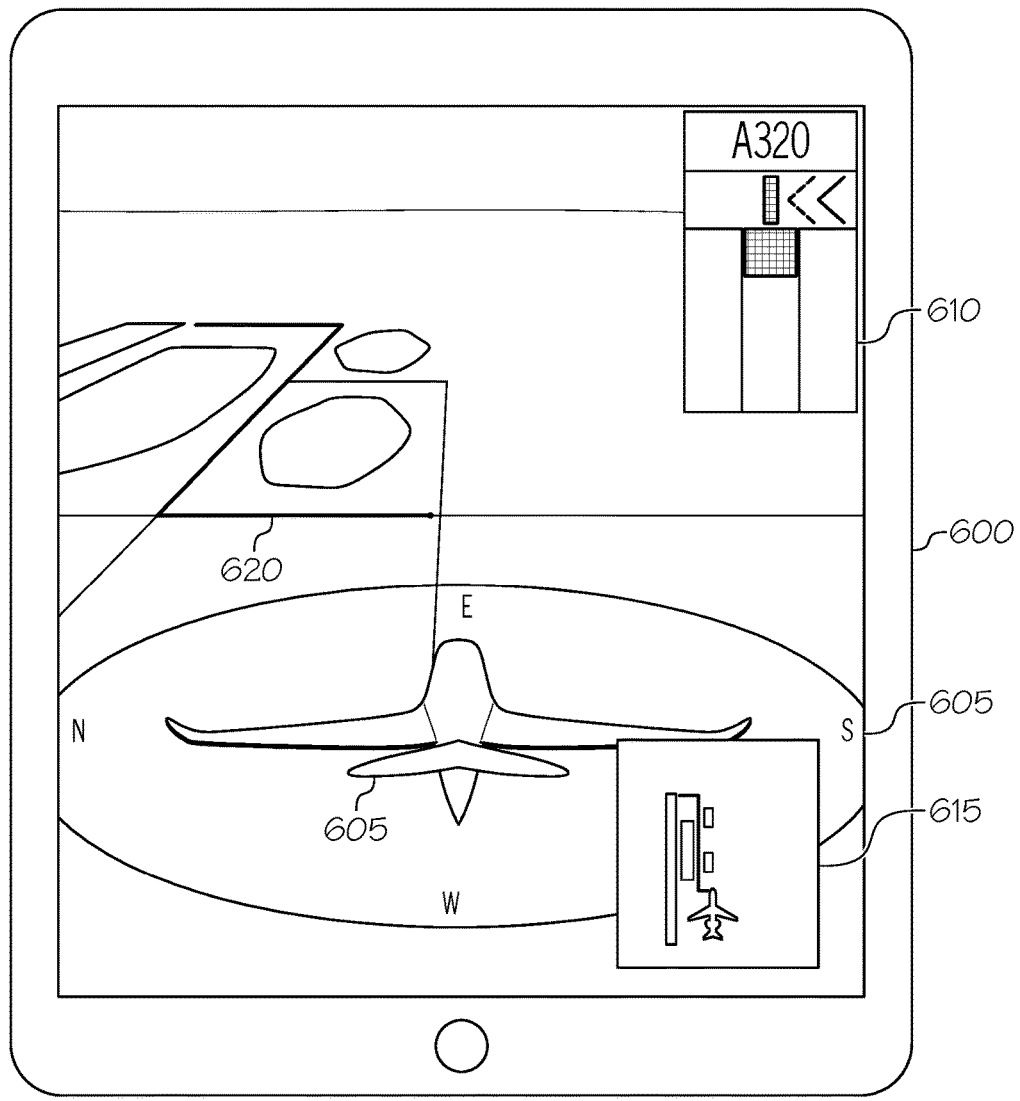
FIG. 6 is a flowchart of the process of the automated guidance system for enabling the aircraft docking in accordance with an exemplary embodiment described herein.

FIG. 6 is an illustration of a screen shot on a display of cues for an aircraft for guidance using the Digital Taxi application in accordance with an exemplary embodiment. The Digital Taxi which can provide Visual Guidance Docking cues with no or limited dependencies on external sources greatly enhancing the safety and efficiency of the docking maneuvers. With just minimal additional configuration data of the ownship 3D volumetric model in conjunction with the Airport Moving Map Database (AMDB), it is possible to provide efficient gate or stand docking capabilities on Airport Moving map applications. The application is scalable for multiple different aircraft types and airports across the world with very little or no upgrades to the Airport Moving Map applications and is applicable to both the General and Commercial Aviation segments. In various embodiments, the Digital Taxi application can provide visual cues, aural or message alerts to the pilots based on the 3D spatial data processing of the Aircraft model and the Gate/Stand information retrieved from the Airport Mapping Database. The symbology used and the figures depicted below are only exemplary in nature and one should appreciate the fact that alternate representation and symbology are possible. With a reference to FIG. 6, in an exemplary embodiment, the display 600 of the Aircraft Using the Digital Taxi Application Annunciation provides Visual Cues on the Digital Taxi Application that the Aircraft is to the Right of the Intended Docking Track and is Required to Move Left for Alignment. The aircraft 605 is indicated to have a route 620 highlighted on the AMM. The aircraft 605 is represent in a scaled 3D synthetic view on the runway in the display 600. The visual cues are layered in a pic-in-pic configuration which can be considered a floating window of window 610. Using an arrow configuration, a visual indication is given to the pilot of the directional heading required for the aircraft 605 to follow the prescribed route 620. The window 615 gives a visual indication of a top down planar view of the aircraft 605 following the route 620. The scaling of the image in the window 615 is increased to give a higher granularity of the route for the aircraft to take to go to the gate or stand point. In various embodiments, the display may be made available to flight controller and airport marshals or others via remote devices to notification in real-time of a particular aircraft position or route at an instance at the airport.

Figure 7:
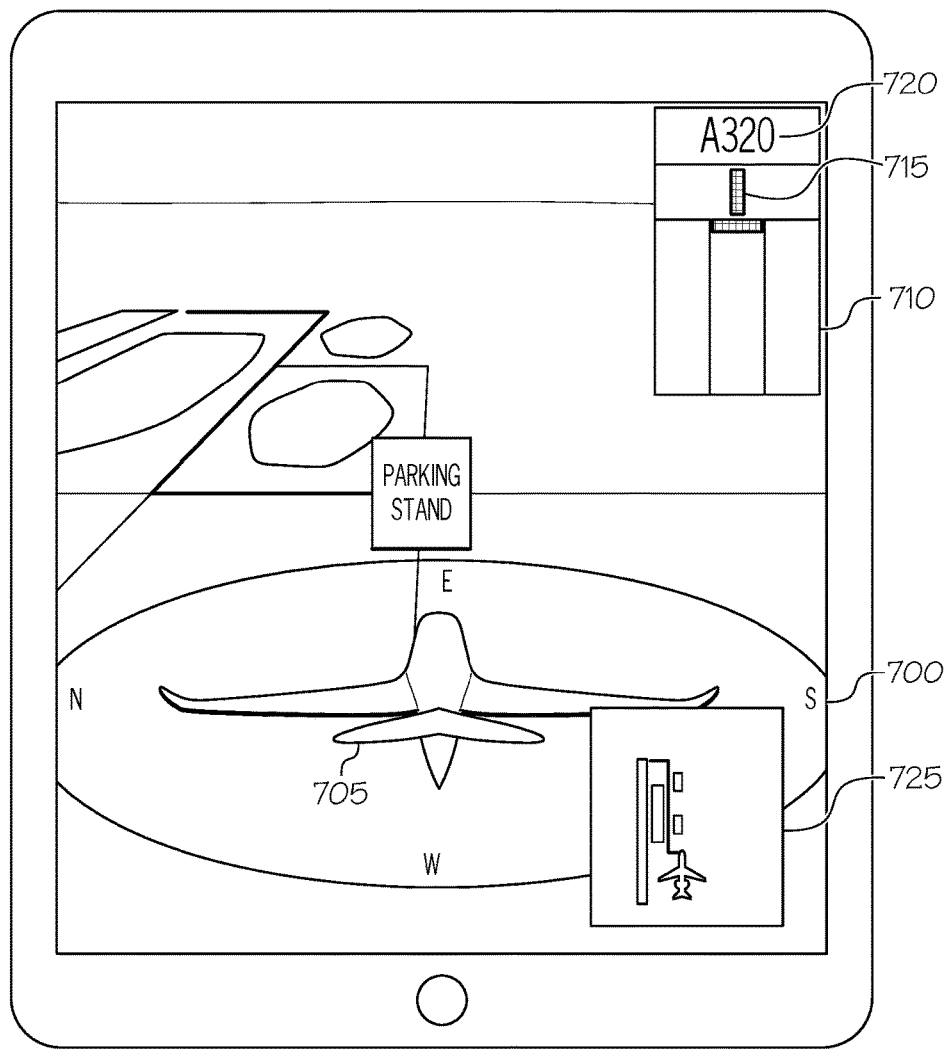
FIG. 7 is an illustration of a screen shot on a display of cues for an aircraft for guidance using the Digital Taxi application in accordance with an exemplary embodiment described herein.

FIG. 7 is another illustration of a screen shot on a display of cues for an aircraft for guidance using the Digital Taxi application in accordance with an exemplary embodiment. The display 700 shows using the Digital Taxi application with both annunciation and with visual cues on the Digital Taxi application that the aircraft is aligned to the docking track and is required to move only a little further. That is, in the window 710, the display shows rows of indicator blocks 715 of two stacked rows and vertical blocks 720 of 6-7 stacked rows indicating the movement for the aircraft to be in a correct parking stand. That is, the aircraft must proceed only a little further designated by the stacked blocks to consummate the parking maneuver. In this way, the pilot no longer has to surmise the right location as the indicator blocks indicate within a tolerance where the aircraft should be positioned. The other window shows by the legend 725 a different scaled view of the aircraft maneuver.

Figure 8:
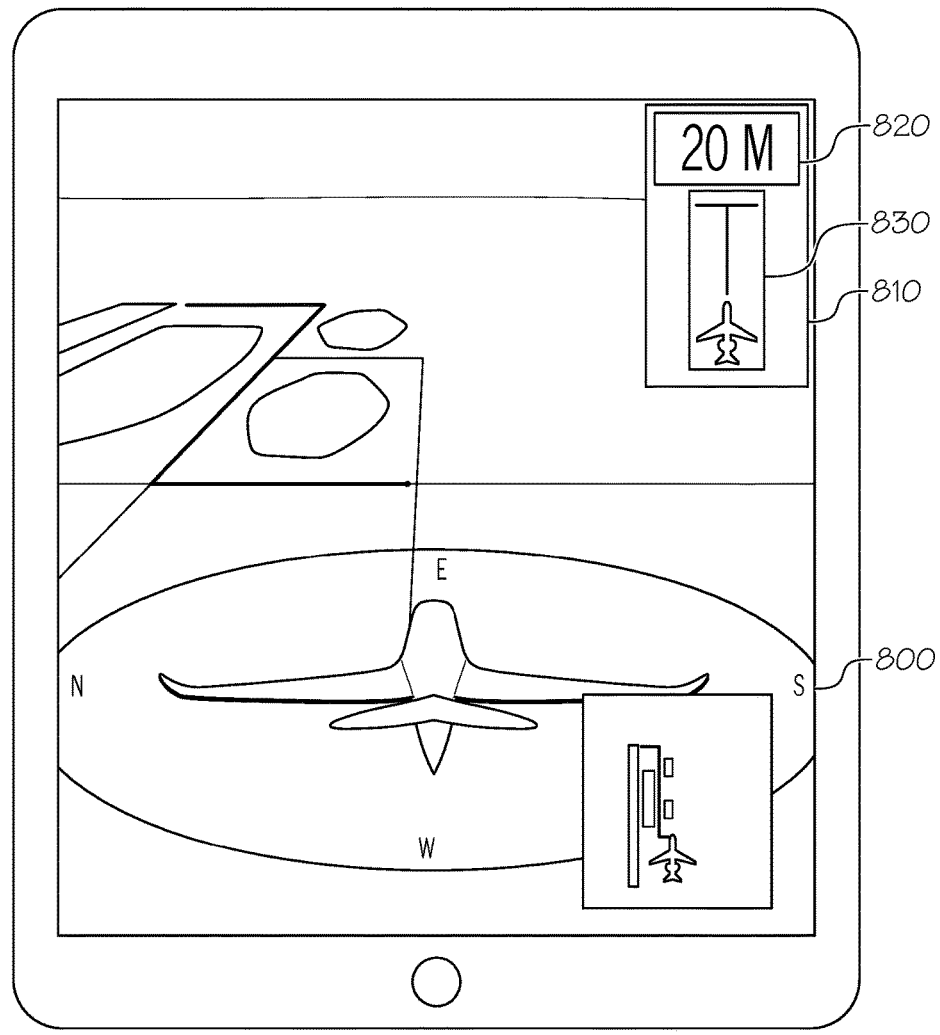
FIG. 8 is an illustration of a screen shot on a display of cues for an aircraft for guidance using the Digital Taxi application in accordance with an exemplary embodiment described herein.

FIG. 8 is another illustration of a screen shot on a display of cues for an aircraft for guidance using the Digital Taxi application in accordance with an exemplary embodiment. In the display 800 of FIG. 8, the visual guidance is shown in the window 810 where the aircraft must proceed a distance shown visually 830 and the amount of distance to park is visually displayed with the counter 820. In this instance the counter 820 indicates that the aircraft must proceed about "20M" in order to achieve the appropriate location to make the parking maneuver.

Figure 9:
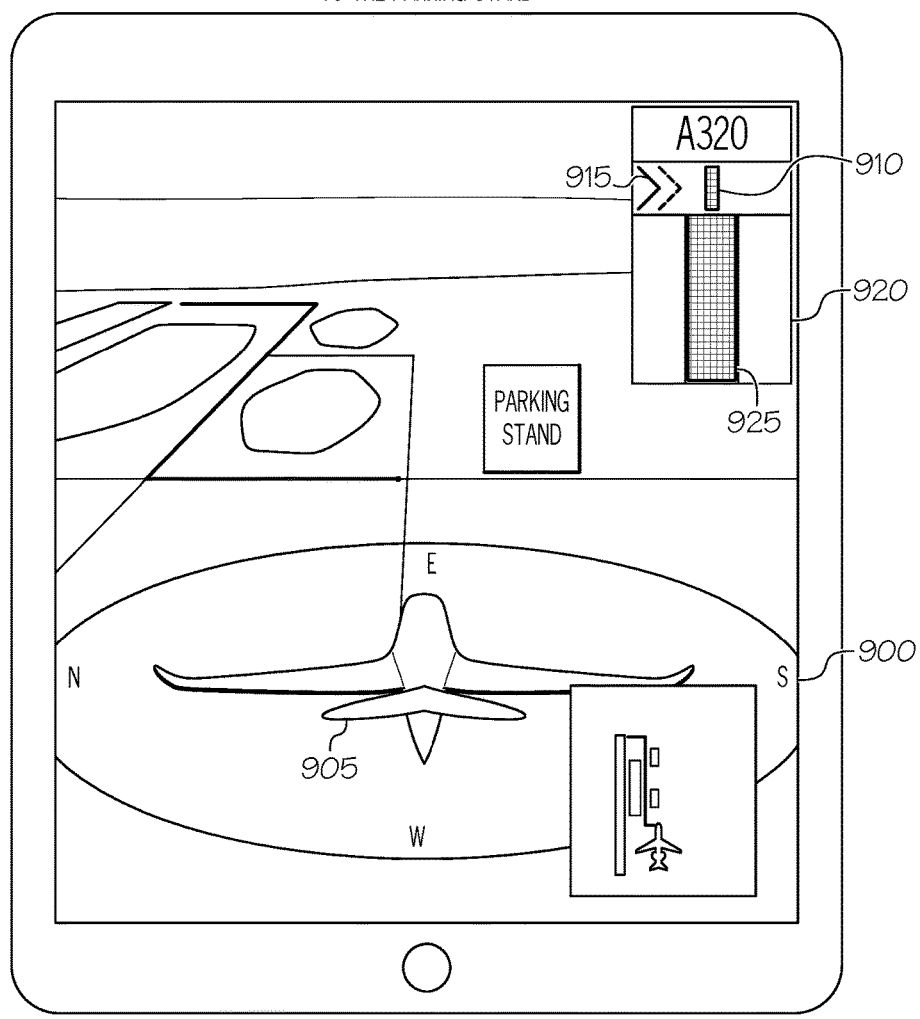
FIG. 9 is an illustration of a screen shot on a display of cues for an aircraft for guidance using the Digital Taxi application in accordance with an exemplary embodiment described herein

FIG. 9 is another illustration of a screen shot on a display of cues for an aircraft for guidance using the Digital Taxi application in accordance with an exemplary embodiment. The display 900 of FIG. 9 shows the annunciation and visual cues on the Digital Taxi Application relative to Right movement of the aircraft 905 to align to the parking stand in window 925 of the display 900. The right movement is shown by right indicator 915. The amount of the right movement is shown by indicator 920 to achieve the parking location which is designated by indicator 910.

In various embodiments, a database, a text file, a XML file or a JSON or any tailored proprietary format etc. may be used for gathering, collecting, or share object data associated with the 3D aircraft synthetic models to the visual docking guidance applications and system.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate the interchangeability of hardware and software, various illustrative components, blocks, modules, circuits, and steps have been described above generally in terms of their functionality.

Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a controller or processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for providing guidance without sensing data about an ownship, the method comprising:
   pre-loading, from an airport mapping database to an electronic information device within a cockpit, airport mapping data for use in guidance of the ownship wherein the electronic information device comprises: a lateral guidance computer;
   executing airport moving map applications by the electronic information device to process the airport mapping data to form a synthesized view for displaying on a display within the cockpit, wherein the airport mapping data comprises: an aerodrome surface, visual aids and markings, and airport structures;
   receiving by the electronic information device within the cockpit at least one of a 3D spatial representation of the ownship;
   overlaying the 3D spatial representation of the ownship onto the synthesized view for providing a visual 3D representation of the ownship; and
   providing, without the sensing data about the ownship, one or more cues, by a digital taxi application of the lateral guidance computer based on only airport mapping data and dimensions associated with the 3D spatial representation of the ownship, on the display of the synthesized view within the cockpit, wherein the cues are associated with information to guide the ownship to docking to a gate or stand location.

2. The method of claim 1, the receiving by the electronic information device further comprising:
   alternately preloading the 3D spatial representation of an aircraft from a 3D database.

3. The method of claim 1, further comprising:
   updating the 3D spatial representation of the ownship from a remote 3D database at a connected server to the lateral guidance computer within the cockpit.

4. The method of claim 1, further comprising:
   providing one or more cues from a set of visual, aural, and message cues by the digital taxi application in the display within the cockpit associated with the information to guide the ownship to the docking to the gate or stand location.

5. The method of claim 1, the information further comprising:
depicting parts in the visual 3D spatial representation of an airframe of the ownship for aligning the ownship based on data associated with the visual 3D spatial representation and the synthesized view; and
generating aircraft surface guidance commands by computing relative deviations of alignments based on dimensions of the ownship to the docking at the gate or the stand location within the synthesized view using the data and the airport mapping information.

6. The method of claim 5, further comprising:
aligning the ownship in the docking by processing, by the electronic information device using software solutions of the digital taxi application, one or more reference points based on dimensions of the ownship in the depicted parts which correspond with one or more location points to the gate or the stand location.

7. The method of claim 6, further comprising:
enhancing aids to guide the ownship to the docking to the gate or the stand wherein the enhanced aids comprise: camera images from external sources.

8. A computer program product for providing guidance to an ownship without a need for sensor data about the ownship, the product comprising: a computer-readable storage medium in which program instructions are stored, the program instructions are configured to cause a lateral guidance computer to perform the operations of:
pre-loading from an airport mapping database to the lateral guidance computer within a cockpit, airport mapping data for use in guidance of the ownship wherein the lateral guidance computer does not require any sensor data about the ownship from sensing devices of the ownship to provide the guidance;
executing airport moving map applications by the lateral guidance computer to process the airport mapping data to form a synthesized view for displaying on a display within the cockpit, wherein the airport mapping data comprises: an aerodrome surface, visual aids and markings, and airport structures;
receiving by the lateral guidance computer within the cockpit a 3D spatial representation of the ownship;
overlaying the 3D spatial representation of the ownship onto the synthesized view for providing a visual 3D representations of the ownship; and
providing, without using sensor data from sensing devices about the ownship, one or more cues, by a digital taxi application of the lateral guidance computer based on airport mapping data and derived dimensions associated with the 3D spatial representation of the ownship, on the display of the synthesized view within the cockpit, wherein the cues are associated with information to guide the ownship in a docking action to a gate or stand location.

9. The computer program product of claim 8, the generating by the electronic information device further comprising:
alternately preloading the 3D spatial representation of the ownship from a 3D database.

10. The computer program product of claim 8, further comprising:
updating the 3D spatial representation of the ownship from a remote 3D database at a connected server to the lateral guidance computer within the cockpit.

11. The computer program product of claim 8, further comprising:
providing one or more cues from a set of visual, aural, and message cues by the digital taxi application in the display within the cockpit associated with the information to guide the ownship in the docking action to the gate or stand location.

12. The computer program product of claim 8, the information further comprising:
depicting parts in the visual 3D representation of an airframe of the ownship for aligning the ownship based on data associated with the visual 3D representation and the synthesized view; and
generating aircraft surface guidance commands by computing relative deviations of alignments based on dimensions of the ownship for docking at the gate or the stand location within the synthesized view using the data and the airport mapping information.

13. The computer program product of claim 12, further comprising:
aligning the ownship in the docking by processing, by the lateral guidance computer using software solutions, one or more reference points based on dimensions of the ownship in the depicted parts which correspond with one or more location points to the gate or the stand location.

14. The computer program product of claim 13, further comprising:
enhancing aids to guide the ownship to the docking to the gate or the stand wherein the enhanced aids comprise: camera images from external sources.

15. A non-transitory computer-readable medium storing a computer program product executable by a processor of a lateral guidance computer system for processing an object request, the non-transitory computer-readable medium comprising:
code for pre-loading from an airport mapping database to the lateral guidance computer within a cockpit, airport mapping data for use in guidance of an ownship wherein the lateral guidance computer does not require any sensor data about the ownship from sensing devices of the ownship to provide the guidance;
code for executing airport moving map applications by an electronic information device to process the airport mapping data to form a synthesized view for displaying on a display within the cockpit, wherein the airport mapping data comprises: an aerodrome surface, visual aids and markings, and airport structures;
code for receiving by the lateral computer within the cockpit a volumetric representation of the ownship;
code for overlaying the volumetric representation of the ownship onto the synthesized view for providing a visual 3D representation of the ownship; and
code for providing, without requiring sensor data from sensing devices about the ownship, one or more cues, by a digital taxi application of the lateral guidance computer based on airport mapping data and derived dimensions associated with the volumetric representation of the ownship, on the display of the synthesized view within the cockpit, wherein the cues are associated with information to guide the ownship to docking to a gate or stand location.

16. The non-transitory computer-readable medium of claim 15 further comprising:
code for alternately preloading the volumetric representation of the ownship from a 3D database.

17. The non-transitory computer-readable medium of claim 15, further comprising:
code for providing one or more cues from a set of visual, aural, and message cues by the taxi application in the display within the cockpit associated with the information to guide the ownship to the docking to the gate or stand location wherein all the provided cues are not based on sensor data.

18. The non-transitory computer-readable medium of claim 17, further comprising:
code for aligning the ownship in the docking by processing, by the lateral guidance computer using software solutions, one or more reference points in the depicted parts of the ownship to correspond with one or more location points to the gate or the stand location.

19. The non-transitory computer-readable medium of claim 17 further comprising:
code for enhancing cues to guide the ownship to the docking to the gate or the stand wherein the enhanced cues comprise: images captured by mobile devices.

20. The non-transitory computer-readable medium of claim 15 further comprising:
code for depicting parts in the visual 3D representation of an airframe of the ownship for aligning the ownship based on derived data associated with the visual 3D representation and the synthesized view; and
code for generating aircraft surface guidance commands by computing relative deviations of alignments based on dimensions of the ownship to the docking at the gate or the stand location within the synthesized view using the data and the airport mapping information.

* * * * *